US008402019B2

United States Patent
Jin et al.

(10) Patent No.: US 8,402,019 B2
(45) Date of Patent: Mar. 19, 2013

(54) TOPIC INITIATOR DETECTION ON THE WORLD WIDE WEB

(75) Inventors: Xin Jin, Urbana, IL (US); William Scott Spangler, San Martin, CA (US); Rui Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/757,379

(22) Filed: Apr. 9, 2010

(65) Prior Publication Data

US 2011/0252025 A1    Oct. 13, 2011

(51) Int. Cl.
G06F 17/30    (2006.01)
(52) U.S. Cl. .................................. 707/723; 715/200
(58) Field of Classification Search ............. 707/723, 707/725, 726, 728
See application file for complete search history.

(56) References Cited

U.S. PATENT DOCUMENTS

| 7,568,148 | B1 | 7/2009 | Bharat et al. | |
|---|---|---|---|---|
| 2003/0033333 | A1 | 2/2003 | Nishino et al. | |
| 2007/0250486 | A1 | 10/2007 | Liao et al. | |
| 2008/0114741 | A1 | 5/2008 | Yaojie et al. | |
| 2010/0185519 | A1* | 7/2010 | Ramaswamy | 705/14.58 |
| 2011/0173264 | A1* | 7/2011 | Kelly | 709/205 |
| 2011/0179114 | A1* | 7/2011 | Dilip et al. | 709/204 |
| 2011/0246457 | A1* | 10/2011 | Dong et al. | 707/725 |
| 2012/0117005 | A1* | 5/2012 | Spivack | 706/11 |

OTHER PUBLICATIONS

Haewoon Kwak, Changhyun Lee, Hosung Park, and Sue Moon, "What is Twitter, a Social Network or a News Media", ACM, WWW Apr. 26-30, 2010, pp. 591-600.*
Jagan Sankaranarayanan et al., "TwitterStand: News in Tweets", ACM GIS, Nov. 4-6, 2009, pp. 42-51.*
Swit Phuvipadawat et al., "Breaking News Detection and Tracking in Twitter", 210 IEEE/WIC/ACM International Conference on Web Intelligence and Inelligent Agent Technology, pp. 120-123.*
Jeff Huang et al., "Conversational Tagging in Twitter", ACM, Jun. 13-16, 2010, pp. 173-177.*
Sahami; Mining the WEb to Determine Similarity Between Words, Objects, and Communities; Google Inc.; Mountain View, CA, 2006.
Yiming Yang, Tom Pierce, and Jaime Carbonell. A study of retrospective and on-line event detection. In Proceedings of the 21st Annual international ACM SIGIR (Melbourne, Australia, Aug. 24-28, 1998). 28-36.
Yiming Yang, etc. Topic-conditioned novelty detection. In Proceedings of the ACM SIGKDD '02. ACM, New York, NY, 688-693.
Lawrence Page and Sergey Brin and Rajeev Motwani and Terry Winograd. The PageRank citation ranking: Bringing order to the web. Technique Report, 1998.
Sournen Chakrabarti, Byron Dom, Prabhakar Raghavan, Sridhar Rajagopalan, Automatic resource compilation by analyzing hyperlink structure and associated text. In Proc. 7th World Wide Web Conference, pp. 65-74, 1997.

(Continued)

Primary Examiner — Cheryl Lewis
(74) Attorney, Agent, or Firm — Shimokaji & Assoc., PC

(57) ABSTRACT

The exemplary embodiments of the present invention provide a system, method and computer program products for determining a particular document that initiated a topic of interest in a collection of documents, were each of the documents has contents and a time it was created. The method includes ranking the documents in the collection based on the respective times that the documents were created, ranking the documents based on how similar their respective contents are to the topic of interest and ranking the documents based on originality of their respective contents. The method further includes producing a composite ranking of the documents based on the time, contents, and originality rankings, and then determining the particular document that initiated the topic of interest from the composite ranking.

25 Claims, 9 Drawing Sheets

OTHER PUBLICATIONS

Indro De (April Kontostathis, Faculty Advisor), Experiments in First Story Detection. Proceedings of the National Conference on Undergraduate Research (NCUR) 2005.

A. Singhal, C. Buckley, and M. Mitra. Pivoted document length normalization. In Proceedings of the ACM SIGIR96. pp. 21-29, 1996.

Raymond Kosala and Hendrik Blockeel. Web Mining Research: A Survey. ACM SIGKDD Explorations. 2000.

S. Robertson and S. Walker. Some simple effective approximations to the 2-poisson model for probabilistic weighted retrieval. SIGIR'94, pp. 232-241, 1994.

* cited by examiner

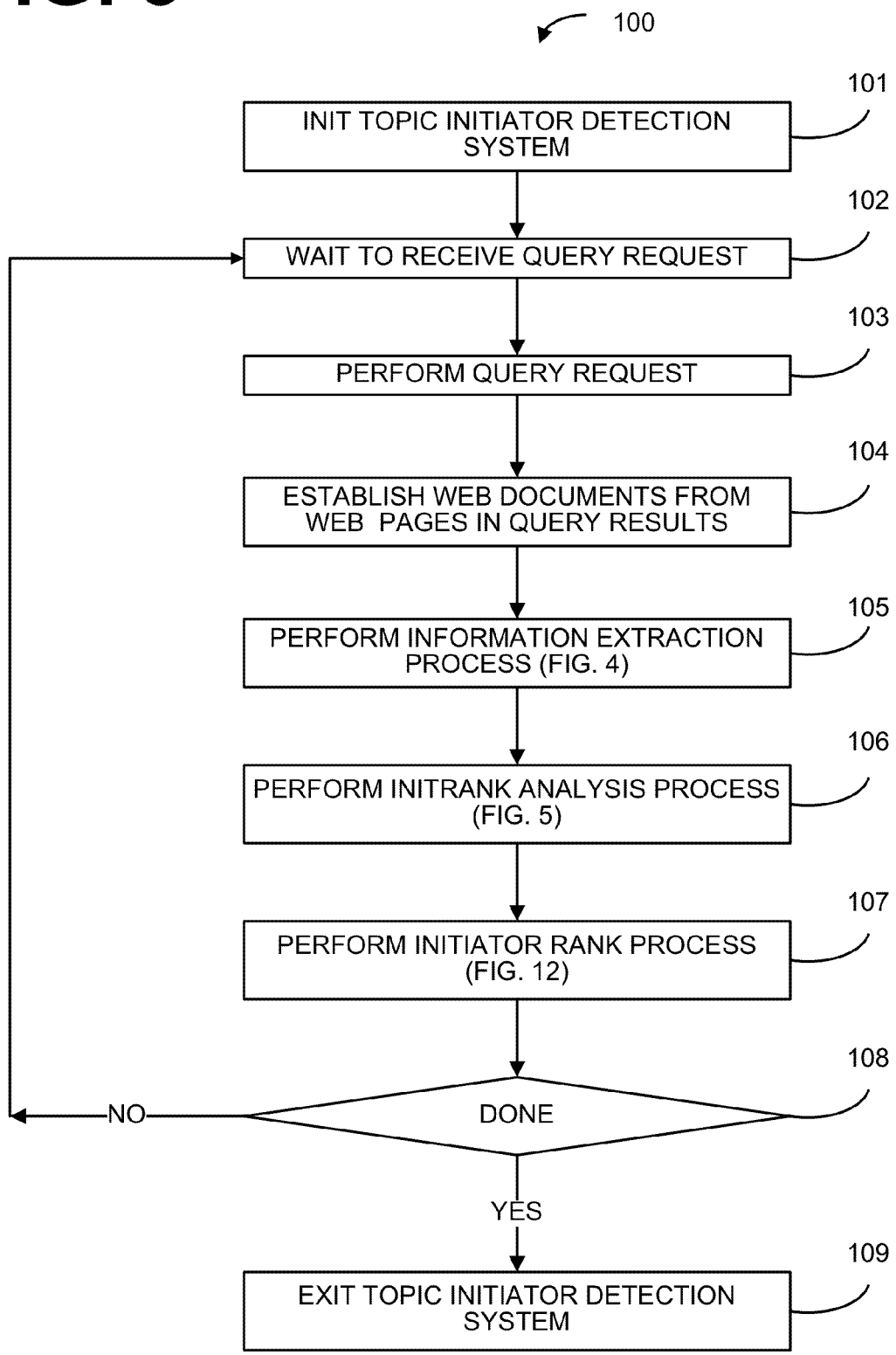

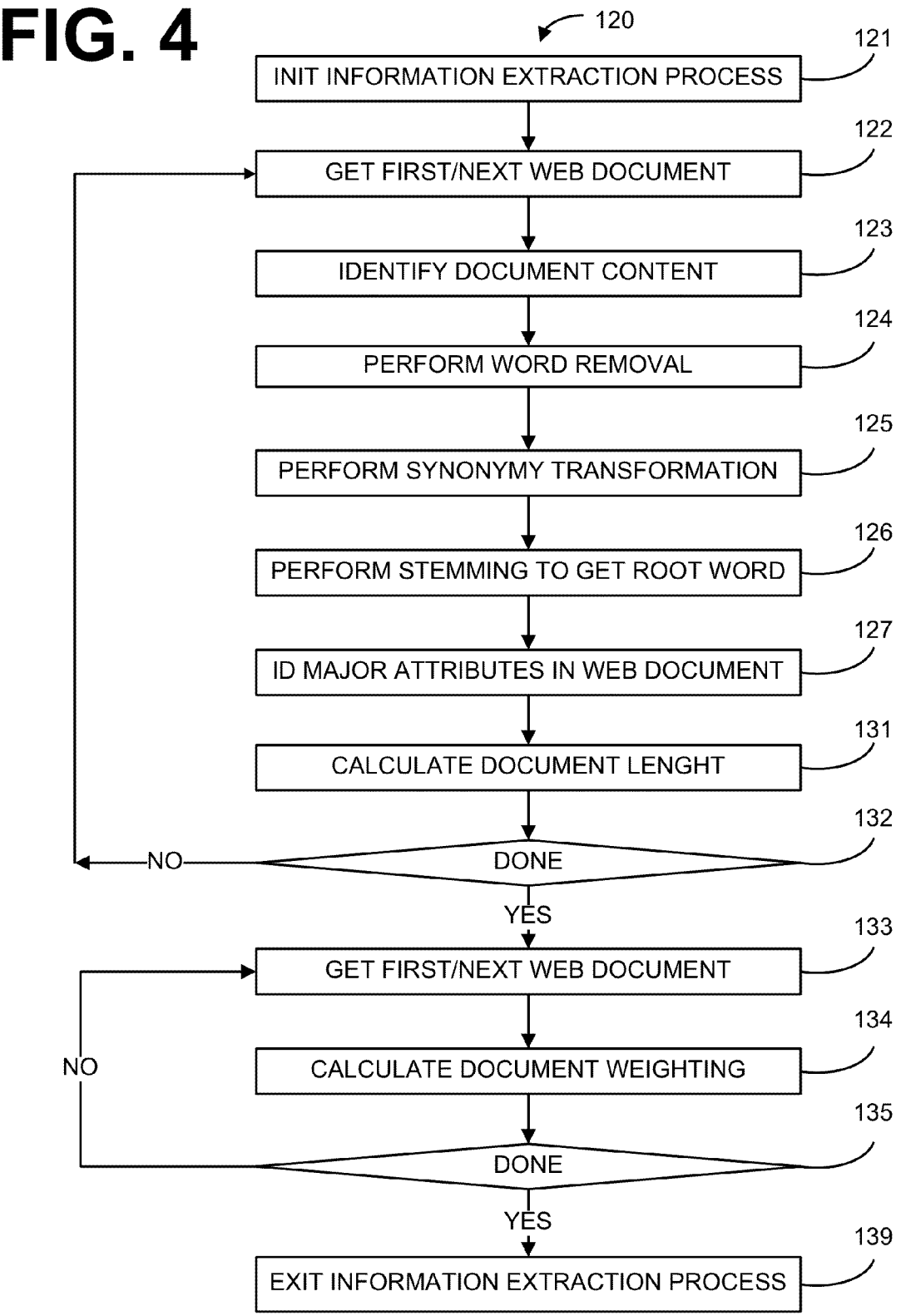

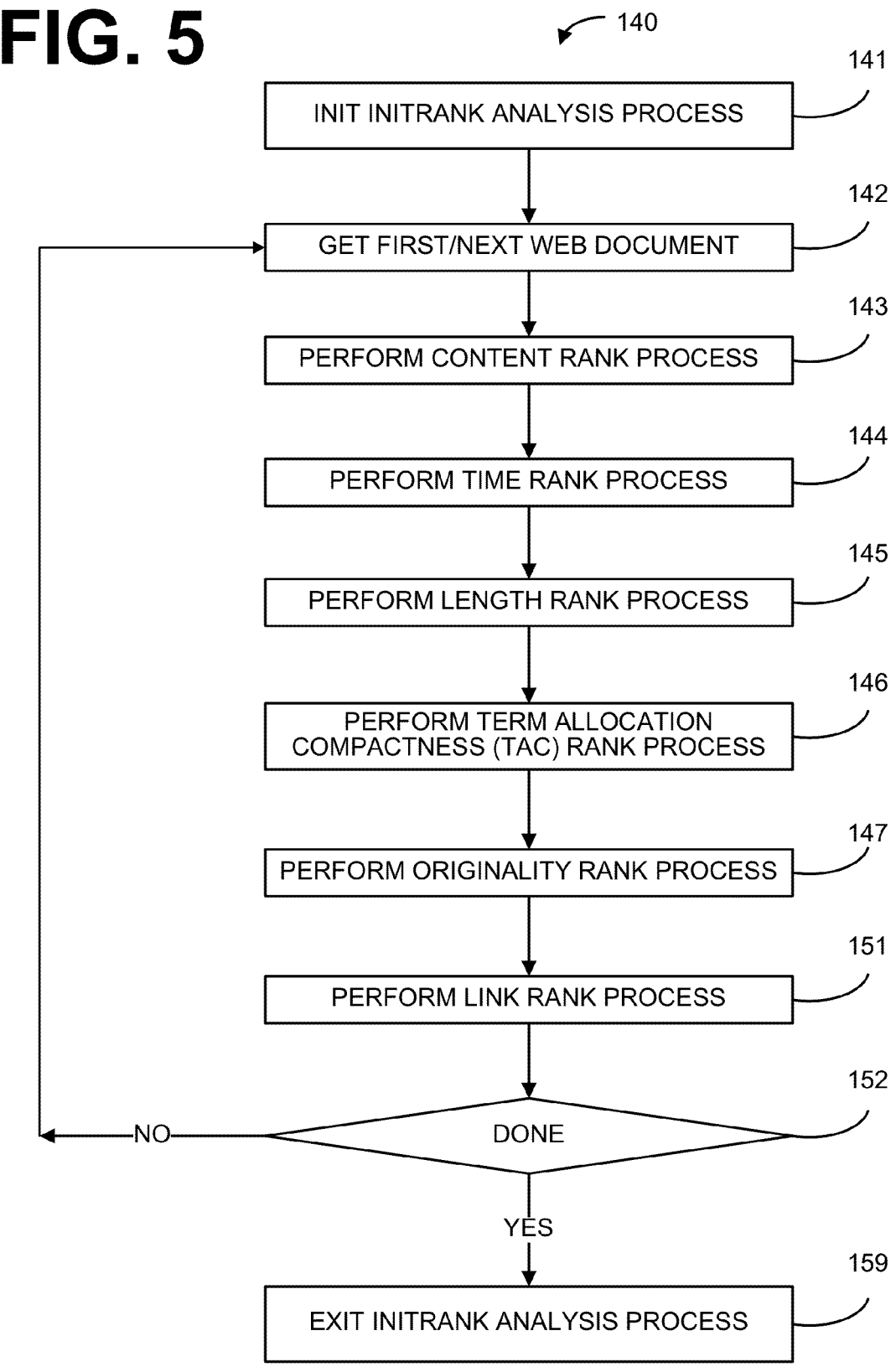

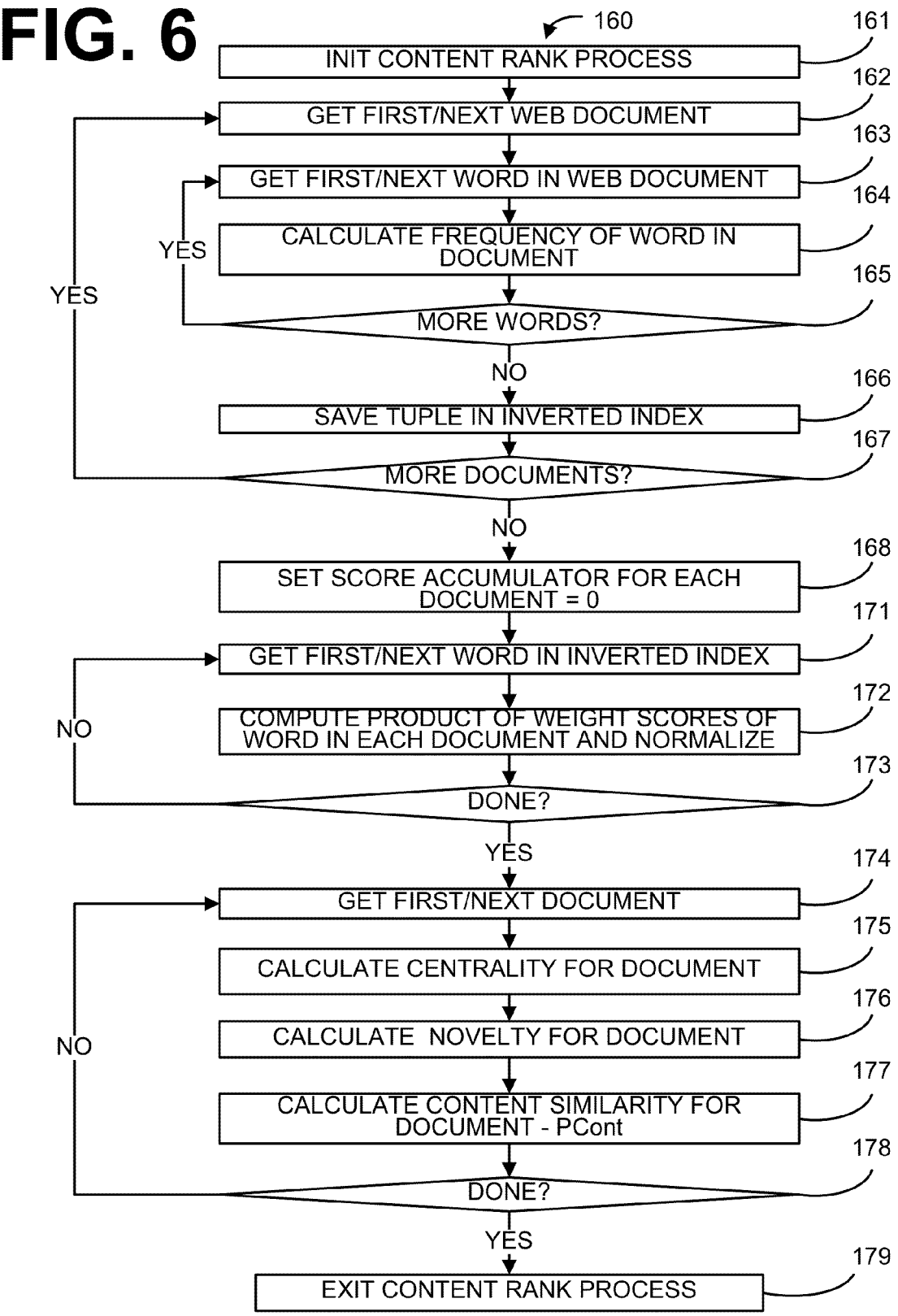

TOPIC INITIATOR DETECTION ON THE WORLD WIDE WEB

FIELD OF THE INVENTION

The present invention generally relates to information search and retrieval, and more particularly, to a system and method for finding which Web document or author that initiated the topic or was the first to discuss the topic.

BACKGROUND

The ability to find relevant material from a large collection of documents (i.e., search or document retrieval) is a well-known and long-studied problem. As to any given topic query, one often wants to know which Web document or author initiated the topic or was the first to talk about the topic. For example, someone started a rumor about a product on the Web and generated many discussions on this topic. The company would like to know who started this rumor. Currently, there is no system that supports this technique or service.

Generally, search engines only return documents or web pages that are most relevant to the query. Some specific search engines provide searching by query and then sort the search results by dates. Take the topic query "vegemite ban" as an example. One search engine returned no result. Another search engine returned only one result, titled "Duck hunting," which was not relevant to the query topic. The reason for returning this webpage is that the word "ban" is in the article of the webpage, and the word "vegemite" is in an advertisement called "Vegemite Sandwich".

A third search engine returned many more results than the previous search engines. However, the problem is that the third search engine only supports searching for a query and then simply sorts the results by date. A fourth search engine provides a service that automatically clusters new articles into groups, each of which contains articles on the same topic, and provides sorting based on relevance or date. The clustering results are not always correct, and, in some cases, articles in the same group are not about the same topic. In addition, the fourth search engine only support news articles, and is not for the whole Internet.

Another drawback of existing search engines systems is that they only support webpage level analysis. When a user wants to find which Web document is the initiator, none of the major search engines works to this level of detail.

BRIEF SUMMARY

Embodiments of the present invention provide a system, method and computer program products for providing topic initiator detection.

An exemplary embodiment includes a method for determining a particular document that initiated a topic of interest in a collection of documents, were each of the documents has contents and a time it was created. The method includes ranking the documents in the collection based on the respective times that the documents were created, ranking the documents based on how similar their respective contents are to the topic of interest and ranking the documents based on originality of their respective contents. The method further includes producing a composite ranking of the documents based on the time, contents, and originality rankings, and then determining the particular document that initiated the topic of interest from the composite ranking.

Another exemplary embodiment includes a system for determining a particular document that initiated a topic of interest in a collection of documents, were each of the documents having contents and a time it was created. Briefly described in terms of architecture, one embodiment of the system, among others, is implemented as follows. The system includes a time ranking module that ranks the documents in the collection based on the respective times that the documents were created, a content ranking module that ranks the documents based on how similar their respective contents are to the topic of interest and an originality ranking module that ranks the documents based on originality of their respective contents. The system further includes a composite ranking module that ranks the documents based on the time, contents, and originality rankings, and a determination module that determines the particular document that initiated the topic of interest from the composite ranking.

A further exemplary embodiment includes a computer program product for determining a particular document that initiated a topic of interest in a collection of documents, each of the documents having contents and a time it was created. The computer program product includes a tangible storage medium readable by a computer system and storing instructions or execution by the computer system for performing a method. The method includes ranking the documents in the collection based on the respective times that the documents were created, ranking the documents based on how similar their respective contents are to the topic of interest and ranking the documents based on originality of their respective contents. The method further includes producing a composite ranking of the documents based on the time, contents, and originality rankings, and then determining the particular document that initiated the topic of interest from the composite ranking.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawing and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a flow chart illustrating an example of the operation of the topic initiator detection system of the present invention utilized by the server, as shown in FIG. 2.

FIG. 4 is a flow chart illustrating an example of the operation of the information extraction process on the server utilized in the topic initiator detection system of the present invention, as shown in FIGS. 2 and 3.

FIG. 5 is a flow chart illustrating an example of the operation of the initrank analysis process on the server utilized in the topic initiator detection system of the present invention, as shown in FIGS. 2-3.

FIG. 6 is a flow chart illustrating an example of the operation of the content rank process utilized in the topic initiator detection system of the present invention, as shown in FIGS. 2-3 and 5.

Figure 1:
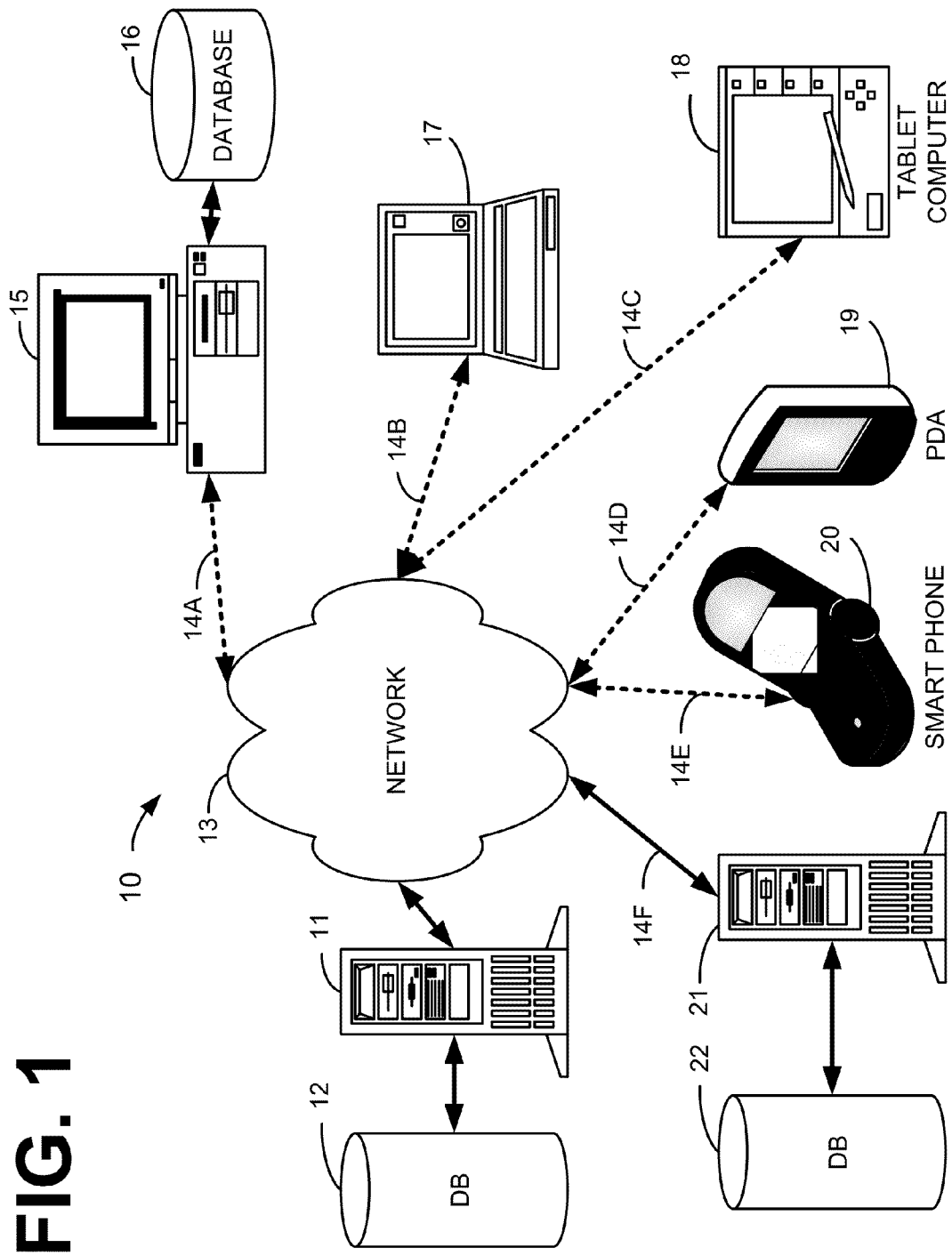
FIG. 1 is a block diagram of one embodiment of the present invention illustrating an example of the network environment for the topic initiator detection on the World Wide Web.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Given a topic query on the Internet and a collection of time-stamped Web document results, each of which contains the query, the topic initiator detection system of the present invention automatically finds which Web document or author initiated the topic or was the first to discuss the topic. To deal with the topic initiator detection system problem, one embodiment of the present invention utilizes a topic initiator detection system and initrank process (i.e., a method of ranking the Web documents by their probability of being the topic initiator). The initrank process is based on features extracted from the Web documents, such as the time, originality, content similarity and link information. Experiments show that, compared with intuitive methods of simple time sorting and famous link based ranking algorithms, such as PageRank and HITS, the topic initiator detection system of the present invention gets the best performance.

There are some research works on New Event Detection ("NED"), also called Novelty Detection or First Story Detection. The task of NED is to automatically detect the earliest report for each event as soon as that report arrives in the sequence of documents. NED is the most difficult task in the research area of Topic Detection and Tracking, which is an important research area in Web Mining. Most NED systems work by comparing a document to all the documents in the past, and use a threshold on the similarity scores to detect novel stories. If all the similarity scores are below the predefined threshold, then the document is predicted as the first story of a novel event.

The major differences between the topic initiator detection system of the present invention and NED are as follows. First, NED works sequentially, but topic initiator detection system is not required to work sequentially. In fact, the non-sequential method usually gets better performance results. Second, the topic initiator detection system, in one embodiment, is a web based system and contains other related information, not just time and text.

In one embodiment, given a topic query on the Internet, the topic initiator detection system of the present invention will find all webpages containing the query word or words. Then, the topic initiator detection system extracts the Web documents within each webpage. Examples of Web documents include, but are not limited to, news articles, blogs, forums and newsgroup postings. The difference between a Web document and a webpage is that a webpage may contain more than one Web document. Several Web documents may appear on the same webpage. For example, blog articles could be posted on the same blog page. Based on Web documents, information such as the author name, time, content and links is also extracted. Finally, the topic initiator detection system returns a list of Web documents, together with the author name(s), ranked by their probability of being the topic initiator or the first to discuss the topic.

In another embodiment, given a topic query for documents in a database, the topic initiator detection system of the present invention will find all the documents containing the query word or words. Then, the topic initiator detection system extracts information such as the author name, time, content and links. Finally, the topic initiator detection system returns a list of documents, together with the author name(s), ranked by their probability of being the topic initiator or the first to talk about the topic.

Referring now to the drawings, in which like numerals illustrate like elements throughout the several views, FIG. 1 illustrates an example of the basic components of a system 10 using the topic initiator detection system on the World Wide Web used in connection with the preferred embodiment of the present invention. The system 10 includes a server 11 and the remote devices 15 and 17-20 that utilize the topic initiator detection on the World Wide Web.

Each remote device 15 and 17-20 has applications and can have a local database 16. Server 11 contains applications, and a database 12 that can be accessed by remote devices 15 and 17-20 via connections 14(A-E), respectively, over network 13. The server 11 runs administrative software for a computer network and controls access to itself and database 12. The remote device 15 and 17-20 may access the database 12 over a network 13, such as but not limited to, the Internet, a local area network (LAN), a wide area network (WAN), a telephone line using a modem (POTS), Bluetooth, WiFi, WiMAX, cellular, optical, satellite, RF, Ethernet, magnetic induction, coax, RS-485, and the like. The server 11 may also be connected to the local area network (LAN) within an organization.

The remote devices 15 and 17-20 may each be located at remote sites. Remote devices 15 and 17-20 include, but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents. Thus, when a user at one of the remote devices 15 and 17-20 desires to utilize the topic initiator detection system on the World Wide Web from the database 12 at the server 11, the remote device 15 and 17-20 communicates over the network 13, to access the server 11 and database 12.

A third party computer system 21 and database 22 can be accessed by the topic initiator detection system 100 on server 11 in order to provide access to additional collections of documents and/or search indices. Data that are obtained from a third party computer system 21 and database 22 can be stored on server 11 and database 12 in order to provide later access to the user on remote devices 15 and 17-20. It is also contemplated that, for certain types of data, the remote devices 15 and 17-20 can access the third party computer system 21 and database 22 directly using the network 13.

Figure 2:
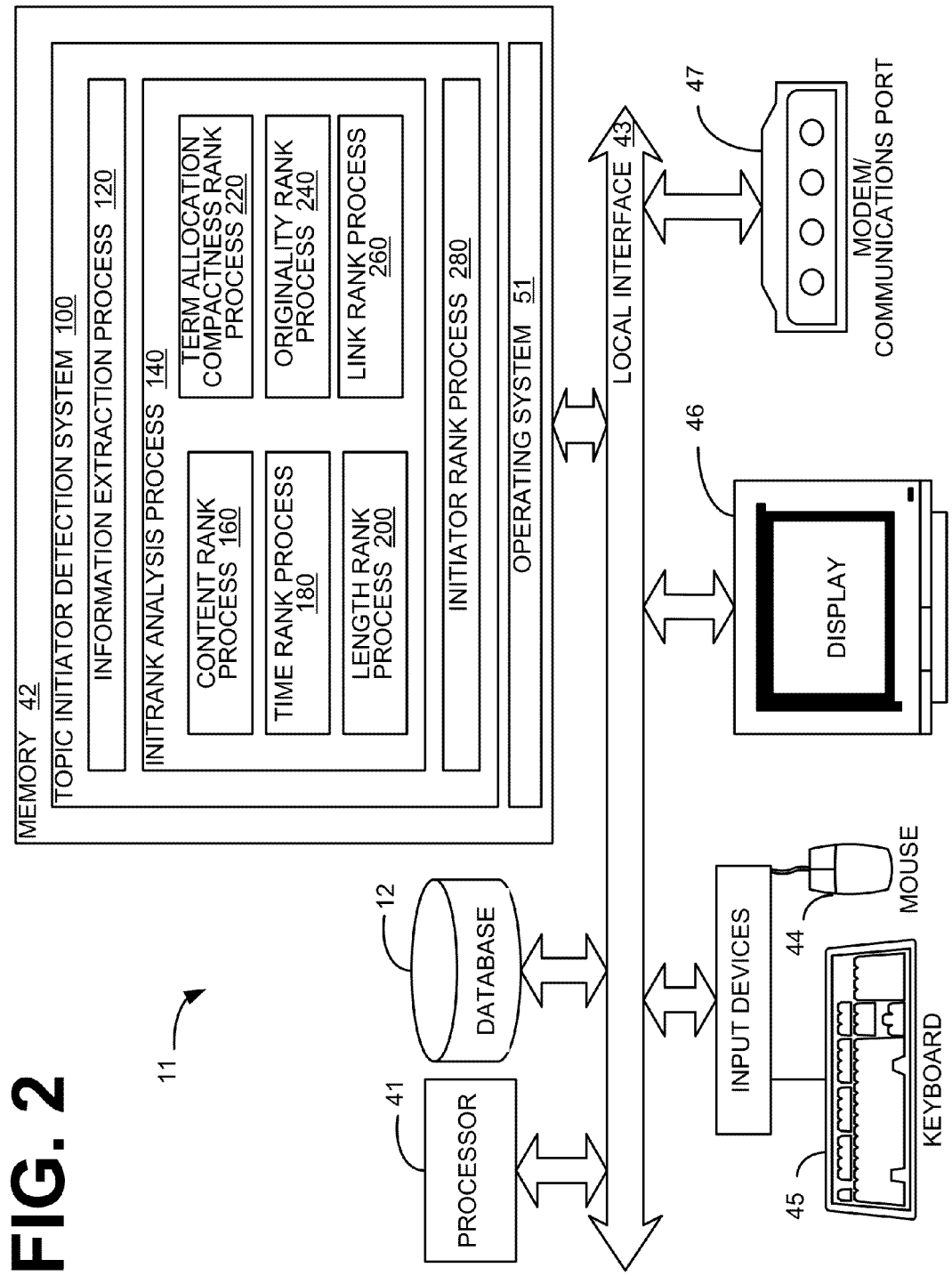
FIG. 2 is a block diagram illustrating an example of a server utilizing the topic initiator detection system of the present invention, as shown in FIG. 1.

Illustrated in FIG. 2 is a block diagram demonstrating an example of server 11, as shown in FIG. 1, utilizing the topic initiator detection system 100 of the present invention. Server 11 includes, but is not limited to, PCs, workstations, laptops, PDAs, palm devices, and the like. The processing components of the third party computer system 21 are similar to that of the description for the server 11.

As shown in FIG. 2, generally, in terms of hardware architecture, the server 11 includes a processor 41, a computer readable medium such as memory 42, and one or more input and/or output (I/O) devices (or peripherals) that are communicatively coupled via a local interface 43. For example, the local interface 43 can be, but is not limited to, one or more buses or other wired or wireless connections as is known in the art. The local interface 43 may have additional elements, which have been omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or a combination of volatile memory elements. For example, random access memory (RAM), dynamic random access memory (DRAM), static random access memory (SRAM), or nonvolatile memory elements (e.g., ROM, programmable read only memory (PROM), erasable programmable read only memory (EPROM), electronically erasable programmable read only memory (EEPROM), tape, compact disc read only memory (CD-ROM), disk, diskette, cartridge, cassette or the like). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the topic initiator detection system 100 of the present invention. As illustrated, the topic initiator detection system 100 of the present invention comprises numerous functional components including, but not limited to, the information extraction process 120, initrank analysis process 140 and initiator rank process 280. The initrank analysis process 140 further includes a content rank process 160, time rank process 180, length rank process 200, term allocation compactness rank process 220, originality rank process 240 and link rank process 260.

A non-exhaustive list of examples of suitable commercially available operating systems 51 includes the following: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, such as the topic initiator detection system 100, and provides scheduling, input-output control, file and data management, memory management, and communication control and related services. However, it is contemplated by the inventors that the topic initiator detection system 100 of the present invention is applicable on all other commercially available operating systems.

The topic initiator detection system 100 may be a source program, executable program (object code), script, or any other entity comprising a set of computer program instructions to be performed. If a source program, then the program is usually translated via a compiler, assembler, interpreter, or the like, which may or may not be included within the memory 42, to operate properly in connection with the O/S 51. Furthermore, the topic initiator detection system 100 can be written as: (a) an object oriented programming language, which has classes of data and methods; or (b) a procedure programming language, which has routines, subroutines, and/or functions, for example, but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner such that the instructions stored in the computer readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example, but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may include devices that communicate both inputs and outputs, for example, but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and, generally, to control operations of the server 11 are pursuant to the software. The topic initiator detection system 100 and the O/S 51 are read, in whole or in part, by the processor 41, perhaps buffered within the processor 41, and then executed.

When the topic initiator detection system 100 is implemented in software, as is shown in FIG. 2, it should be noted that the topic initiator detection system 100 can be embodied in any computer-readable medium for use by, or in connection with, an instruction execution system, apparatus, or device such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

Program code embodied on a computer readable medium may be transmitted using any appropriate medium, including, but not limited to, wireless, wireline, optical fiber cable, RF, etc., or any suitable combination of the foregoing.

In an alternative embodiment, where the topic initiator detection system 100 is implemented in hardware, the topic initiator detection system 100 can be implemented with any one or a combination of the following technologies, which are each well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the topic initiator detection system 100 of the present invention on server 11 and database 12 using, for example, but not limited to, an Internet browser. The information accessed in server 11 and database 12 can be provided in a number of different forms, including, but not limited to, ASCII data, WEB page data (i.e. HTML), XML or other type of formatted data.

As illustrated, the remote devices 15 and 17-20 are similar to the description of the components for server 11 described with regard to FIG. 2. Hereinafter, the remote devices 15 and 17-20 will be referred to as remote device 15 for the sake of brevity.

Aspects of the present invention are described below with reference to flowchart illustrations and/or block diagrams of methods, apparatus (systems) and computer program products according to embodiments of the invention. It should be understood that each block of the flowchart illustrations and/or block diagrams, and combinations of blocks in the flowchart illustrations and/or block diagrams, can be implemented by computer program instructions. These computer program instructions may be provided to a processor in a general purpose computer, special purpose computer, or other programmable data processing apparatus to produce a machine such that the instructions, which execute via the processor of the computer or other programmable data processing apparatus, create the means for implementing the functions/acts specified in the flowchart and/or block diagram block or blocks.

FIG. 3 is a flow chart illustrating an example of the operation of the topic initiator detection system 100 of the present invention utilized by the server 11, as shown in FIG. 2. Given a topic query on the Internet and a collection of time-stamped Web document results, each of which contains the query, the topic initiator detection system 100 of the present invention provides a system and methodology for automatically finding which Web document or its author initiated the topic or first discussed the topic.

First at step 101, the topic initiator detection system 100 is initialized. This initialization includes the startup routines and processes embedded in the BIOS of the server 11. The initialization also includes the establishment of data values for particular data structures utilized in the topic initiator detection system 100.

At step 102, the topic initiator detection system 100 waits to receive a query request. Once a query request is received at step 102, the topic initiator detection system 100 performs the query request at step 103. One example of a query is described in commonly assigned and co-pending U.S. Patent Application entitled "SYSTEMS, METHODS AND COMPUTER PROGRAM PRODUCTS FOR A SNIPPET BASED PROXIMAL SEARCH", Ser. No. 12/757,365 filed on, Apr. 9, 2010, herein incorporated by reference.

At step 105, the information extraction process is performed. The information extraction process extracts major attributes from each Web document, identified as document content, and performs word preprocessing and the like. This information extraction is performed because the analysis is based on Web document level instead of web page level. Web documents are extracted from the web pages. Each webpage may contain one or multiple Web documents. Some web pages even contain less than one Web document. The web page and Web document mapping describe the relationship between a webpage and a Web document. There are three kinds of webpage-Web document mapping: one-one, one-multiple and multiple-one. One-one maps one webpage to one Web document. One-multiple maps one webpage to multiple Web documents; for example, a blog page may contain multiple postings. Multiple-one maps multiple webpages to one Web document; for example, some news website divides an article into several webpages to gain more clicks. The information extraction process is herein defined further detail with regard to FIG. 4.

At step 106, the topic initiator detection system 100 performs the initrank analysis process. The initrank analysis process is a method of ranking the Web documents by their probability of being the topic initiator. The initrank analysis process calculates ranking based on features obtained from the Web documents, such as the time, originality, content similarity and link information. The initrank analysis process is herein defined in further detail with regard FIG. 5.

At step 107, the topic initiator detection system 100 performs the initiator rank process. The initiator rank process gives a combined solution and shows good performance in a robust fashion in diverse situations. The initiator rank process is defined as a function of several components obtained in the initrank analysis process executed at step 106. The initiator rank process utilizes the components as factors that are independent of each other. Examples of the components include, but are not limited to, originality, content similarity, term gap, number of links pointing to a document and document length. The initrank value is calculated as a multiplicative model of the already normalized components. The initiator rank process is herein defined in further detail with regard FIG. 12.

At step 108, it is determined if the topic initiator detection system 100 is to wait for an additional query request. If it is determined at step 108 that the topic initiator detection system 100 is to wait to receive additional query requests, then the topic initiator detection system 100 returns to repeat steps 102 through 108. However, if it is determined at step 108 that there are no more actions to be received, then the topic initiator detection system 100 then exits at step 109.

FIG. 4 is a flow chart illustrating an example of the operation of the information extraction process 120 on the server that is utilized in the topic initiator detection system 100 of the present invention, as shown in FIGS. 2-3. At each Web document identified in the query at step 103, the information extraction process 120 identifies document content, performs removal of stop words, transforms different words to a single form and words to the root form. This is to create a coherent description of the search query's Web documents result. In addition, document weighting is also calculated. This text then becomes the basis of an initrank analysis.

First at step 121, the information extraction process 120 is initialized. This initialization includes the startup routines and processes embedded in the BIOS of the server 11. The initialization also includes the establishment of data values for particular data structures utilized in the information extraction process 120.

At step 122, the information extraction process 120 waits to receive a first or next Web document resulting from a query at step 103. At step 123, the information extraction process identifies document content. A document can be represented in many different ways. In one embodiment, a document can be represented with the Title and complete text of the document. In another embodiment, the document can be represented with the Title and snippets of text within the document. In one such embodiment, the snippet includes the single sentence that contains the query word. In another such embodiment, the snippet includes multiple sentences before and after the sentence containing the query word. In still another embodiment, the snippets of text include the core sentence that contains the query word, and the sentences before and after the core sentence.

At step 124, information extraction process 120 performs word removal using a stop-word list. "Stop-words" is the name given to words that are filtered out prior to processing a search result. The words are filtered out because the words are too common and carry too little meaning to be useful for searching. In addition to using a standard stop-word list to eliminate words such as "and", "but", and "the", some other words, such as "cdata", "nbsp", "http", "www", "pdf" and "html", are also included in the stop-word list. The additional words are included because they are common in many webpage documents and provide little information about the topic.

At step 125, the information extraction process 120 performs the synonymy transform. There are many synonymies, such as USA and U.S., IBM and International Business Machine. If only Web documents containing the query words are returned, then some related words can be missed. For example, if the query is "USA", U.S. articles will be missed. To handle synonymies, a list of synonymies and transform words is employed to transform different words to a single form.

At step 126, the information extraction process 120 performs stemming process. The stemming process is used to transform a word into its root form. This is also performed in order to reduce the number of related words they can be missed.

At step 127, the major attributes in each Web document are identified. For each Web document, the information extraction process 120 extracts many related types of information, as listed in Table 1.

TABLE 1

Major Attributes Extracted from a Web Document

| Attribute | Description |
| --- | --- |
| Date | Publication time. Format: month/day/year |
| Domain | Website domain of the article |
| URL | URL of the article |
| Title | Title of the article |
| Text | Text content of the article |
| ThreadId | Identification of the thread |
| ForumId | Identification of the forum |
| ForumName | Name of the forum |
| Author | Name of the author |
| BBStype | Type of BBS |
| SourceType | Type of the source, such as MessageBoard, Blog and News |
| Country | Country of the website |
| LinkURL | Set of link/citation URLs |
| LinkDomain | Set of link/citation website domains |
| Query | Keyword(s) of the query |

At step 131, the information extraction process 120 computes the document length as the current Web document is being examined. The document length is included in the major attributes extracted from the Web document.

At step 132, the information extraction process 120 determines if there are more Web documents to be analyzed for information extraction. If it is determined at step 132 that there are more documents to be examined, then the information extraction process 120 returns to repeat steps 122 through 132. However, if it is determined at step 132 that there are no more documents to be examined for information extraction, then the information extraction process 120 proceeds to calculate document weighting for each document at steps 133-135.

At step 133, the information extraction process 120 gets the first or next Web document to be processed. At step 134, the document weighting for document representation is calculated utilizing formula 1 listed below. In one embodiment, a vector space model is used to represent the document. In contrast to the common tf·idf weighting, a tf·df weighting method is used, which is especially useful for topic initiator detection system 100 of the present invention.

$$\frac{pow(tf, \alpha)}{(1-s)+s\frac{dl}{avdl}} \cdot pow(df, \beta) \quad (1)$$

Here tf is the term's frequency in the document, df is the number of documents that contain the term, dl is the document length (number of terms), and avdl is the average document length in the collection. Parameters $\alpha$ and $\beta$ control the importance of high frequent tf and df, respectively. In one embodiment, parameters are set to $\alpha=0.3$ and $\beta=0.2$. Traditionally, df is used to reduce the impact of words appearing in too many documents. However, in this application, high df terms are actually more interesting. Note, the stop-word list has been employed to remove functional words with very high df, like "the", "a" and "you". The remaining words should be likely related to the topic.

At step 135, the information extraction process 120 determines if there are additional Web documents to have the document weighting attribute calculated. If it is determined at step 135 that there are more Web documents to have the document weighting attribute calculated, then the information extraction process 120 returns to repeat steps 133 through 135. However, if it is determined at step 135 that there are no more Web documents to have the document weighting attribute calculated, then the information extraction process 120 exits at step 129.

FIG. 5 is a flow chart illustrating an example of the operation of the initrank analysis process 140 on the server that is utilized in the topic initiator detection system 100 of the present invention, as shown in FIGS. 2 and 3. The initrank analysis process 140 is a method of ranking the Web documents by their probability of being the topic initiator. The initrank analysis process calculates ranking based on features obtained from the Web documents, such as the time, originality, content similarity and link information.

First at step 141, the initrank analysis process 140 is initialized. This initialization includes the startup routines and processes embedded in the BIOS of the server 11. The initialization also includes the establishment of data values for particular data structures utilized in the initrank analysis process 140.

At step 142, the initrank analysis process 140 waits to receive a set of Web documents resulting from the query search, at step 103, with information extracted by the information extraction process 120. At step 143, the initrank analysis process 140 performs the content rank process. The content rank process analyzes the contents of the Web documents to ensure that the Web documents really are pertinent to the query topic. The content rank process is herein defined in further detail with regard to FIG. 6.

At step 144, the initrank analysis process 140 performs the time rank process. The time rank process determines, based upon time information, the probability that a Web document may be the topic initiator. It is intuitive that, given a topic query and Web documents containing the query word or words, a document that appears earlier should have a higher probability of being the topic initiator. The time rank process is herein defined in further detail with regard to FIG. 7.

At step 145, the initrank analysis process 140 performs the length process. The length rank process determines if a Web document is long enough to provide useful information. The length rank process is herein defined in further detail with regard to FIG. 8.

At step 146, the initrank analysis process 140 performs the term allocation compactness rank (TAC) process. The TAC process determines the absolute gap between terms, because if the terms of the query appear close to each other in a document, the higher the competences that the document is about the query topic. The TAC process is herein defined further detail with regard to FIG. 9.

At step 147, the initrank analysis process 140 performs the originality process. The originality process determines if the document currently being analyzed is a reply to a previous document. If the current document is a reply to a previous document, then it can be assumed that the document is not the originator of the topic because it is normally unusual that someone starts a new burst of topics when replying to a letter topic. The originality C process is herein defined in further detail with regard to FIG. 10.

At step 151, the initrank analysis process 140 performs the link rank process. The link rank process determines the probability that a Web document is the topic initiator by calculating a function based on the link information. The assumption is that, if a document is cited by other documents, then it has a better chance of being the topic initiator. The link rank process is herein defined in further detail with regard to FIG. 11.

At step 152, the initrank analysis process 140 determines if there are additional Web documents to be analyzed. If it is determined at step 152 that there are more Web documents to be analyzed, then the information extraction process 120 returns to repeat steps 142 through 152. However, if it is determined at step 152 that there are no more Web documents to be analyzed, then the initrank analysis process 140 exits at step 159.

The flowchart and block diagram in FIG. 5 illustrates the architecture, functionality, and operation of possible implementations of initrank analysis process 140, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in FIG. 5. For example, two blocks shown in succession may in fact be executed substantially concurrently, or the blocks may sometimes be executed in the reverse order, depending upon the functionality involved.

FIG. 6 is a flow chart illustrating an example of the operation of the content rank process 160 utilized in the topic initiator detection system 100 of the present invention, as shown in FIGS. 2-3 and 5. The content rank process 160 analyzes the contents of the Web documents to ensure that the Web documents really are pertinent to the query topic. Document contents should be considered for topic initiator mining because some documents may happen to contain the query words, but are not really concerned with the topic. The contents of the documents are analyzed to make sure that the document is really pertinent to the query topic. The belief is that, if two documents are about the same topic, then there is a high probability that they are similar to each other in content.

First at step 161, the content rank process 160 is initialized. This initialization includes the startup routines and processes embedded in the BIOS of the server 11. The initialization also includes the establishment of data values for particular data structures utilized in the content rank process 160.

At step 162, the content rank process 160 waits to receive a set of Web documents resulting from the query search at step 103, with information extracted by the information extraction process 120. At step 163, the first/next word in the Web document is obtained. In one embodiment, only the preprocessed words in the Web document are utilized. In another embodiment, all words in the Web document are utilized.

Next step 164, the content rank process 160 calculates the frequency of the word in the document. At step 165, it is determined if there are more words in the Web document to have their frequency counted. If it is determined at step 165 that there are more words to have their frequency counted in the Web document, then the content rank process 160 returns to repeat steps 163 through 165. However, if it is determined at step 165 that the frequency of all words has been counted, then the content rank process 160 saves the frequency word count in an inverted index list of tuples (docId, freq) at step 166, where "docId" is the identification of the document that contains the word and "freq" is the frequency of the word in this document. In one embodiment, steps 162 through 167 can be ignored if already performed, which is naturally the case for search engine systems.

Next, at step 167, it is determined if there are more documents to have the frequency of words calculated. If it is determined at step 167 that there are more documents to be processed, then the content rank process 160 returns to repeat steps 162-167. However, if it is determined at step 167 that there are no more documents to have their word frequencies calculated, then the content rank process 160 sets the score accumulator for each document=0.0 at step 168.

At steps 171-173, the content rank process 160 accumulates document similarities. In one embodiment, the inverted index makes it possible to avoid building the document vectors, which are very sparse and highly dimensional since the number of words is large. The lengths of the documents are pre-computed using the weighting scheme. Based on the dot product part of the cosine similarity function, only matching words contained in both documents contribute to the similarity of the two documents so the function can be computed directly via the inverted index instead of from the document vectors. For each word $w_i$, fetch the inverted list $\{(docId_1, freq_1), \ldots, (docId_n, freq_n)\}$. For each entry $(docId_j, freq_j)$: compute the product of the weighting scores of the word in document $d_i$ and $docId_j$; update score accumulator for document $docId_j$; and normalize the score by the length of the two documents based on the cosine function using the formula listed below as formula 2.

$$\cos(d_i, d_j) = \frac{\vec{d}_i \cdot \vec{d}_j}{\|\vec{d}_i\| \cdot \|\vec{d}_j\|} \qquad (2)$$

At step 171, the content rank process 160 gets the first/next word in the inverted index. At step 172, compute the product of the weighting scores of the word in each document, and normalize based on the cosine function, with regard to every other document for that word in the inverted index. At step 173, it is determined if the computer product has been performed for all the words in the inverted index.

Next is the calculation of the Rank by Content Similarity, which is calculated for each Web document in steps 174-178. At step 174, the first/next document is obtained. The following can be assumed given a topic query and search results: (1) a result document would either belong to the topic or not; (2) documents of the topic are similar with each other; and (3) documents that are not related to the topic will not be similar with each other and not similar with the topic documents. A topic initiator should be similar in content with the later documents, and the similarity between the document and all other documents give a hint on the potential of the document being concerned with the query topic. At step 175, the centrality of the document is calculated using the formula listed below as formula 3. Centrality of a Web document $d_i$ can be defined as the average similarity between $d_i$ and all other documents in the collection.

$$\text{Centrality }(d_i) = \frac{1}{N-1} \sum_{j \neq i}^{N} sim(d_i, d_j) \qquad (3)$$

Centrality is computed purely based on text content. It is a good indicator of how much the document is related to the topic (i.e., relevance). However, more assumptions need to be made and time information must be considered in order to find the topic initiator. One assumption is that a topic initiator should be similar to follow-up documents. Another one is that the topic initiator should not be similar to earlier documents. They lead to the following two formulas listed below as formulas 4 & 5:

$$AS_E \text{Max}(d_i) = \underset{t_j < t_i}{\mathrm{argmax}} \{sim(d_i, d_j)\} \quad (4)$$

$$AS_L(d_i) = \frac{1}{N_L} \cdot \sum_{(j \neq i) \wedge (t_j > t_i)}^{N} sim(d_i, d_j) \quad (5)$$

$N_L$ is the number of Web documents that appear later than document $d_i$.

At step 176, the novelty of the Web document is calculated, as defined in formula 6. Based on the above two factors, Novelty of a Web document $d_i$ can be defined as follows, $$\text{Novelty } (d_i) = (AS_L(d_i) - \lambda \cdot AS_E \text{Max}(d_i) + \lambda)/(1 + \lambda) \quad (6)$$

In one embodiment, set $\lambda = 0.7$. The Novelty function values from 0 to 1.

At step 177, the content similarity for the document is calculated. The content similarity for a document is calculated using formulas 7 & 8 below. The topic initiator should be both central and novel. The probability of the document $d_i$ being a topic initiator is calculated as a function of Centrality and Novelty, $P_{Cont}(d_i)=$ $$P_{Cont}(d_i) = EpsNormInc(\text{Centrality }(d_i)) \cdot EpsNormInc(\text{Novelty }(d_i)) \quad (7)$$

$$EpsNormInc(x) = \frac{2}{1 + e^{-x/\mu}} - 1 \quad (8)$$

In one embodiment, set $\mu$=percentile25(Centrality sum of all documents)/4 for the Centrality part and $\mu$=percentile75 (Novelty sum of all documents)/4 for the Novelty part. This is to degrade the change in values when the Centrality or Novelty score is already big enough.

At step 178, content rank process 160 determines if there are more documents to rank. If there are more documents to rank, then the content rank process 160 returns to repeat steps 174 through 178. However, if it is determined at step 178 that there are no more documents to rank, then the content rank process 160 exits at step 179.

Figure 7:
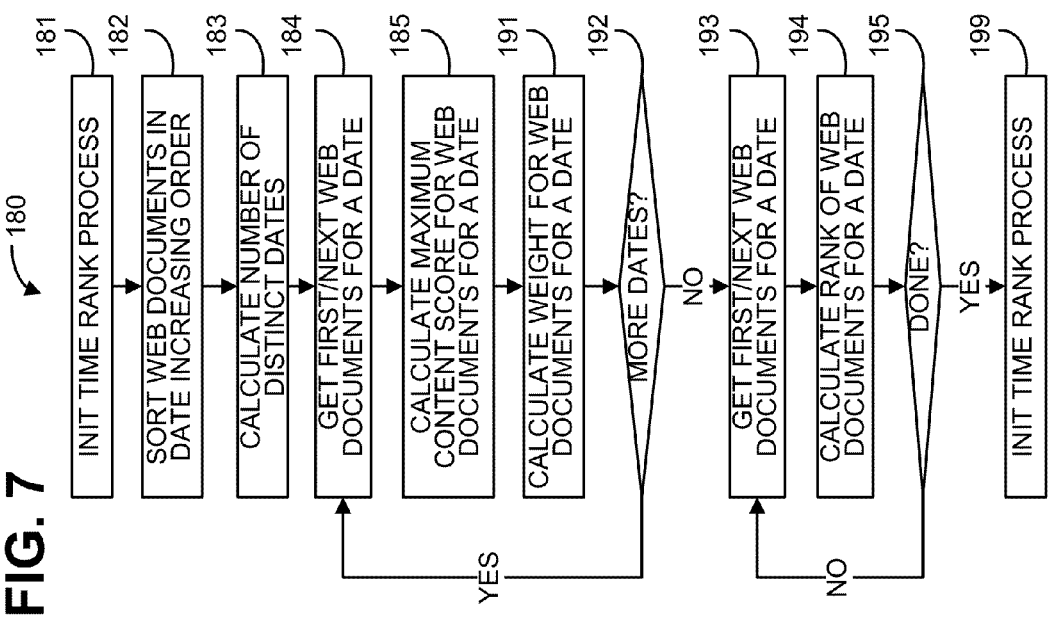
FIG. 7 is a flow chart illustrating an example of the operation of the time rank process utilized in the topic initiator detection system of the present invention, as shown in FIGS. 2-3 and 5.

FIG. 7 is a flow chart illustrating an example of the operation of the time rank process 180 utilized in the topic initiator detection system 100 of the present invention, as shown in FIGS. 2-3 and 5. The time rank process 180 determines, based upon time information, the probability that a Web document may be the topic initiator. It is intuitive that, given a topic query and Web documents containing the query word/words, a document which appears earlier should have a higher probability of being the topic initiator based on time information; the probability of the document $d_i$ being the topic initiator can be evaluated as a ranking function.

First at step 181, the time rank process 180 is initialized. This initialization includes the startup routines and processes embedded in the BIOS of the server 11. The initialization also includes the establishment of data values for particular data structures utilized in the time rank process 180.

At step 182, the time rank process 180 sorts the Web documents in date increasing order utilizing the attributes extracted from the Web document, at step 127. At step 183, the time rank process 180 determines the number of distinct dates. For the order aspect, the dates are sorted in increasing order $O = \{st_1, st_2, \ldots, st_P\}$, P is the number of distinct dates, $P \leq N$, where N is the number of documents. Define the order of time/date t as $\text{Order}(t) = q$, where $t = st_q$. Since $st_j$ is the jth sorted date, $\text{Order}(st_j) = j$.

At step 184, the time rank process 180 gets the first/next Web document for a date. At step 185, the time rank process 180 calculates the maximum content score for the Web document for a date using the formula listed below as formula 9. For a date $st_j$, let $D(st_j) = \{d_i | t_i = st_j\}$ as the set of documents whose publication date is $st_j$, MCS is defined as the maximum content score of those documents.

$$MCS(st_j) = \underset{d_i \in D(st_j)}{\mathrm{argmax}} \{ContentScore(d_i)\} \quad (9)$$

For simplicity, Centrality( ) is used as the ContentScore. At step 191, the time rank process 180 calculates the weight for the Web documents for a date and normalizes the order using the formula listed below as formula 10. For a date $st_j$, define its weight $W(st_j)$ as a score related to the Order and $MCS(st_j)$, and normalize the Order using the EpsNormDec function. In one embodiment, the time rank process 180 sets $\mu = 0.5$.

$$W(st_j) = EpsNormDec(\text{Order}(st_j)) \cdot MCS(st_j) \quad (10)$$

$$= \left(2 - \frac{2}{1 + e^{-j/\mu}}\right) \cdot MCS(st_j)$$

At step 192, the time rank process 180 determines if there are more dates to be processed. If it is determined that there are more dates to be processed, then the time rank process 180 returns to repeat steps 184 through 192. However, if it is determined that there are no more dates to be processed, then the time rank process 180 gets the first or next Web document for a date at step 193. At step 194, the time rank process 180 calculates the rank of the Web documents for a date, as defined in formula 11. The rank for document $d_i$ by time is determined as follows.

$$P_{Time}(d_i) = \frac{\sum_{j=1}^{Order(t_i)} W(st_j)}{\sum_{j=1}^{P} W(st_j)} \quad (11)$$

Limitations of using time information include the following. First, the first document is not necessarily the topic initiator because it may happen to contain these query words, but is not really about the topic. Even considering weighting by order and content, the current ranking function will still rank the first document as top 1. Other factors are needed to get the true topic initiator. Next, some documents may appear at the same date. In the illustrated example, the time rank process 180 only considers the day level because of two reasons: (1) many websites only support time information on this level; and (2) to avoid impact of different time zones for websites located at different places in the world. Only time information use will not be enough in such a case. In an alternative embodiment, when time stamps for the documents is available, it is utilized in time rank process 180 as date/time. In another alternative embodiment, to avoid impact of different time zones the time stamp on the documents is resolved to a single time zone, such as for example Greenwich Mean Time. In still another alternative embodiment, for those documents that do not have a time stamp, a predetermined time can be assigned. For example, the predetermined time for each time zone is set to noon. Then, when the predetermined time is resolved to a single time zone, the impact of the different time zones is minimized.

At step 195, the time rank process 180 determines if there are more dates with Web documents to be processed. If it is determined at step 195 that there are more dates with Web documents to be processed, then the time rank process 180 returns to repeat steps 193-195. However, if it is determined at step 195 that there are no more dates with Web documents to be processed, then the time rank process 180 then exits at step 199.

Figure 8:
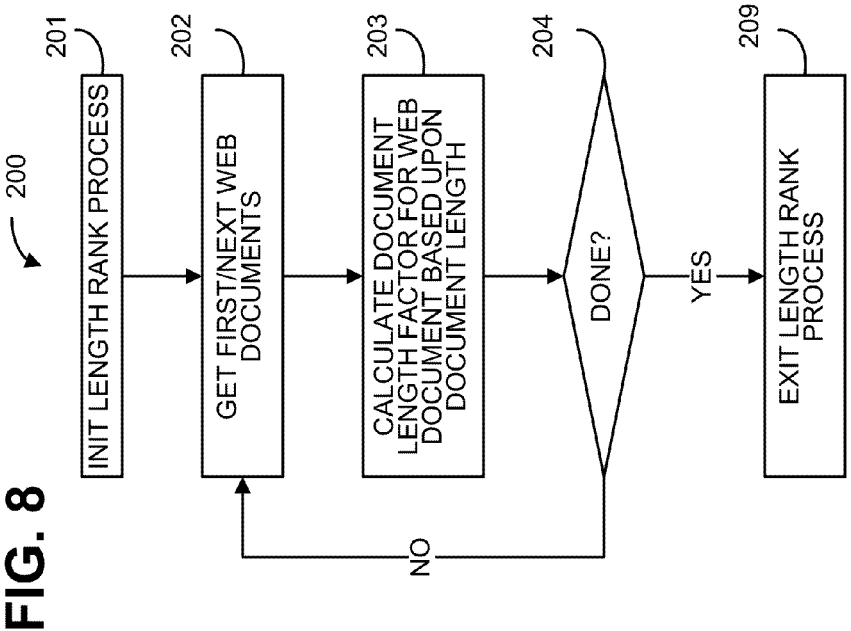
FIG. 8 is a flow chart illustrating an example of the operation of the length rank process utilized in the topic initiator detection system of the present invention, as shown in FIGS. 2-3 and 5.

FIG. 8 is a flow chart illustrating an example of the operation of the length rank process 200 (i.e., Document Length Factor (DLF)) utilized in the topic initiator detection system 100 of the present invention, as shown in FIGS. 2-3 and 5. The length rank process 200 determines if a Web document is long enough to provide useful information.

First at step 201, the length rank process 200 is initialized. This initialization includes the startup routines and processes embedded in the BIOS of the server 11. The initialization also includes the establishment of data values for particular data structures utilized in the length rank process 200.

At step 182, the length rank process 200 calculates the document length factor for a Web document. The calculation of the document length factor is preferred because some forum or newsgroup postings are very short, but contain many query keywords. Thus, the overall similarity to the other documents may be high. To deal with this problem, it is assumed that a Web document should be long enough to provide useful information. Let $L(d_i)$ be the length (number of words) of document $d_i$; the Document Length Factor (DLF) is defined to utilize this assumption. DLF is computed using the EpsNormInc function with document length using formula 12.

$$DLF(d_i) = EpsNormInc(L(d_i)) \quad (12)$$
$$= \frac{2}{1 + e^{-L(d_i)/\mu}} - 1$$

The length of a Web document usually ranges from 1 to over 3000. It is assumed that a document containing more than around 50 words brings enough information to start a widespread topic. Based on the property of the EpsNormInc function, $\mu=7$ is set in one embodiment. In this setting, documents longer than around 50 have DLF close to 1, thus a document that is 50 words long has a DLF score similar to document having 500 words, because they are both long enough. However, a Web document having only 5 words has a very small DLF score, which indicates that the document is too short to be a topic initiator.

At step 204, the length rank process 200 determines if there are more documents to be processed. If it is determined at step 204 that there are more documents to be processed, then the length rank process 200 returns to repeat steps 202 through 204. However, if it is determined at step 204 that there are no more Web documents to be processed, then the length rank process 200 exits at step 209.

Figure 9:
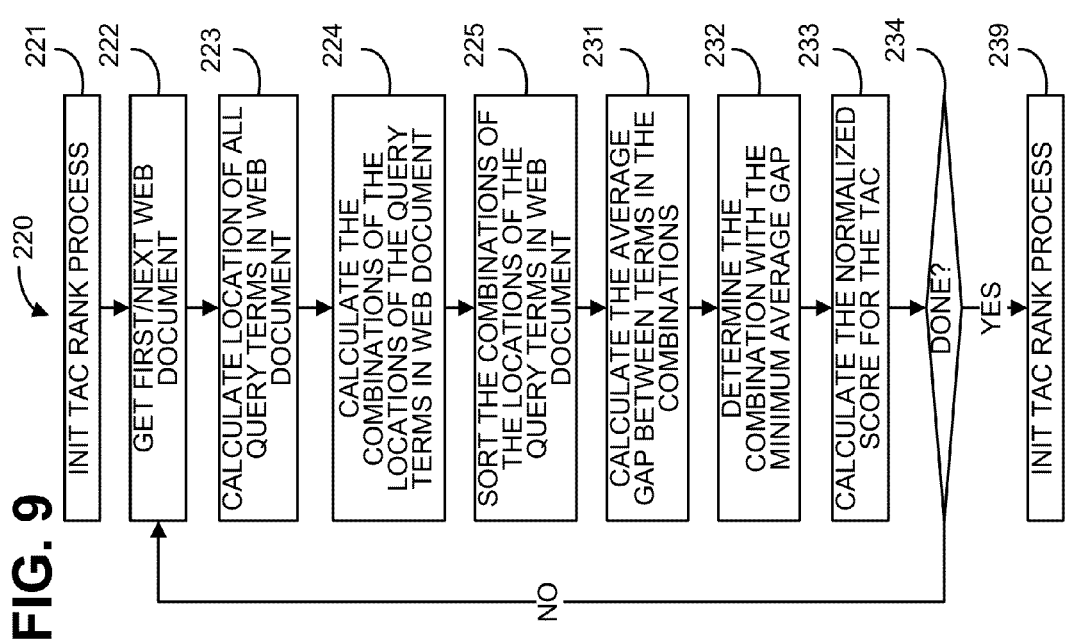
FIG. 9 is a flow chart illustrating an example of the operation of the term allocation compactness rank process utilized in the topic initiator detection system of the present invention, as shown in FIGS. 2-3 and 5.

FIG. 9 is a flow chart illustrating an example of the operation of the term allocation compactness (TAC) rank process 220 utilized in the topic initiator detection system 100 of the present invention, as shown in FIGS. 2-3 and 5. Both the vector space model and language model ignore the relative gap between terms. However, the term gap gives a hint on the topic focus of the document. The gap in the query terms in the document is of special interest. If the terms of the query appear close to each other in a document, then confidence is increased that the document is about the query topic. If the query terms appear far away from each other in the document, then the probability of the document focusing on the query topic is. The Term Allocation Compactness (TAC) score is utilized to determine the term gap for ranking.

First at step 221, the TAC rank process 220 is initialized. This initialization includes the startup routines and processes embedded in the BIOS of the server 11. The initialization also includes the establishment of data values for particular data structures utilized in the TAC rank process 220.

At step 222, the TAC rank process 220 gets the first/next Web document. At step 223, the TAC rank process 220 calculates the location of all the query terms in the Web document. At step 224, the TAC rank process 220 calculates the combinations of the locations of the query terms in the Web document using formula 13. At step 225, the TAC rank process 220 sorts the combinations of locations of the query terms in the Web document. A term may appear in the document d for one or more times. For a query of n terms, $q_i$ denotes the ith (i=1, ..., n) term of the query, $m_i$ denotes the number of appearances of term $q_i$ in the document d, $Z_i=\{1, \ldots, m_i\}$, $l_{ij}$ denotes the location of the jth ($j \epsilon Z_i$) appearance of term $q_i$ in the document. The value of $l_{ij}$ ranges from 1 to L, and L is the length of the document. Define c as a combination of the location of the terms in the document.

$$c = \{l_{1j_1}, l_{2j_2}, \ldots, l_{nj_n} | j_i \epsilon Z_i\} \quad (13)$$

Denote $C=\{c\}$ as the set of combinations for the query in the document; the number of different combinations M is calculated as defined in formula 14.

$$M = |C| = \prod_{i=1}^{n} m_i \quad (14)$$

The TAC rank process 220 only considers the absolute gap between terms, and ignores the relative order. For example, "Google and IBM" is considered as the same as "IBM and Google". To facilitate computation, the locations in c are sorted in increasing order. Then c is re-represented as cs using formula 15, when $ls_i$ is the location of the ith term in the sorted cs.

$$cs = \{ls_1, ls_2, \ldots, ls_n\} \quad (15)$$

Here $ls_i$ is the location of the ith term in the sorted cs. Based on the sorted combination cs, the average gap between terms is calculated at step 231, as defined in formula 16.

$$AveGap(cs) = \frac{1}{n-1} \sum_{i=1}^{n-1} (ls_{i+1} - ls_i - 1) \quad (16)$$

Each combination has an average gap value, but not all combinations are useful. The TAC rank process 220 only selects the combination with the minimum average gap, at step 232. The minimum average gap is calculated using the formula listed below as formula 17.

$$MinGap(d) = \underset{cs \in C}{\operatorname{argmin}} \{AveGap(cs)\} \quad (17)$$

Finally, the TAC score is calculated as a normalized score at step 233, as defined in formula 18.

$$P_{Gap}(d_i) = EpsNormDec(MinGap(d_i)) \quad (18)$$
$$= 2 - \frac{2}{1 + e^{-MinGap(d_i)/\mu}}$$

The value ranges from 0 to 1 and the higher the value, is better. In one embodiment, set $\mu=100$. Note that although term gap is a good topic indicator, it does not necessarily mean a document with compact query terms allocation is necessarily concerned with the topic. The topic initiator detection system 100 still has to check the whole content of the document to see its true major topic.

At step 234, the TAC rank process 220 determines if there are more Web documents to be processed. If it is determined at step 234 that there are more Web documents to be processed, then the TAC rank process 220 returns to repeat steps 222-234. However, if it is determined at step 234 that there are no more documents to be processed, then the TAC rank process 220 exits at step 239.

Figure 10:
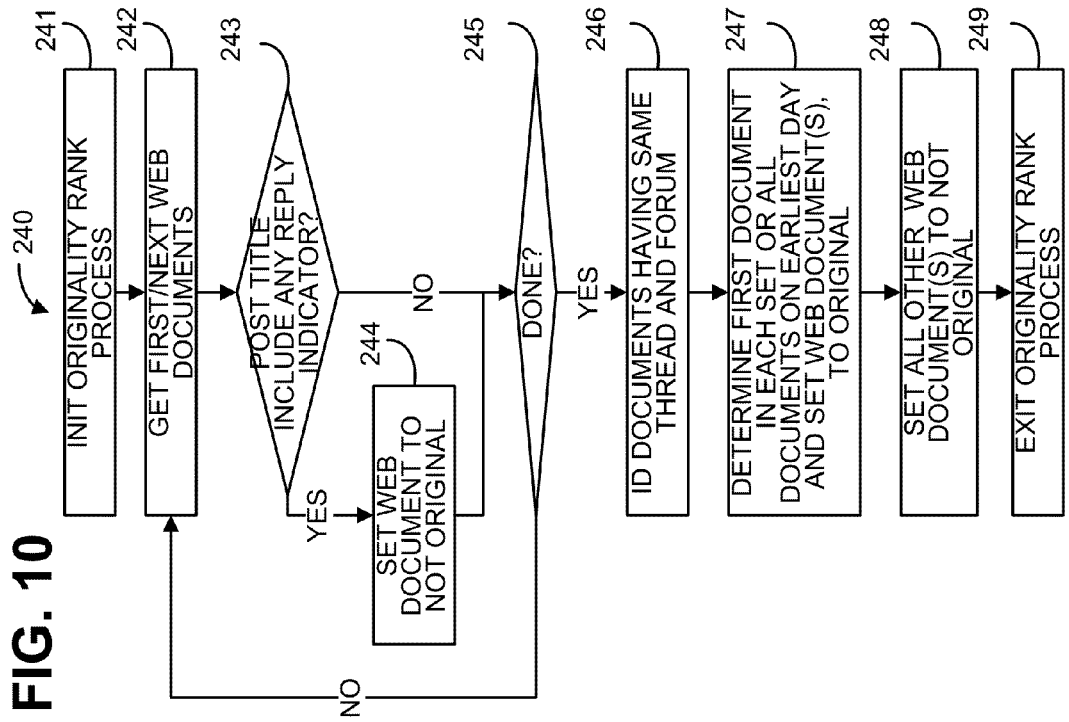
FIG. 10 is a flow chart illustrating an example of the operation of the originality rank process utilized in the topic initiator detection system of the present invention, as shown in FIGS. 2-3 and 5.

FIG. 10 is a flow chart illustrating an example of the operation of the originality rank process 240 utilized in the topic initiator detection system 100 of the present invention, as shown in FIGS. 2-3 and 5. The originality factor is introduced because a topic initiator should be original. The following rules are considered and deciding whether the Web document is original or not: Rule 1. If a post's title begins with "Re:" (or other reply indicators, for example, "RE:", "Reply #99 on:" and "reply to why girls don't like big dogs"), the post is not original. The probability of being a starter is low for the post, because it is normally unusual that someone starts a new topic when replying to a topic post. Rule 2. For postings within the same thread of the same forum, the post in the first day is original. In one embodiment, this is achieved by forming a new attribute ThrForId, which is a merge of the ThreadId and ForumId. Documents with the same ThrForId belong to the same group of discussion; only the document from the first day is considered original. Rule 3. The problem for rule 2 is that even on the same day, there could be many postings. Ideally, the first posting should be chosen because others are just replies. However, if the exact time of each posting is unknown, then the default is to simply decide that they are all original.

First, at step 241, the originality rank process 240 is initialized. This initialization includes the startup routines and processes embedded in the BIOS of the server 11. The initialization also includes the establishment of data values for particular data structures utilized in the originality rank process 240.

At step 242, the originality rank process 240 gets the first/next Web document. At step 243, the originality rank process 240 determines if the posted title includes any reply indicator. The title can be found in the attributes extracted from the Web document, at step 127. If it is determined at step 243 that the post title includes any reply indicator, then the Web document originality factor is set to "not original" at step 244. However, if it is determined that the post title and the Web document does not include any reply indicator, then the originality rank process 240 determines if there are more Web documents to be processed at step 245. If it is determined at step 245 that there are more Web documents to be processed, then the originality rank process 240 returns to repeat steps 242-245.

However, if it is determined at step 245 that there are no more Web documents to be processed, then the originality rank process 240 identifies any Web documents having the same thread and forum as defined above under rules 2 and 3, at step 246. At step 247, the originality rank process 240 attempts to determine the first document in each set or all documents on the earliest day. These Web documents are set to be original and unless these documents already have a setting of not original under rule one defined above. At step 248, all other Web documents not currently set are then set to not original.

Based on originality information, the probability of the Web document being the topic initiator is evaluated as follows.

$$Orig(d_i) = \begin{cases} 1 & \text{original} \\ \alpha & \text{not original} \end{cases} \quad (19)$$

Parameter $\alpha$ controls the probability of a non-original document being the initiator. A setting of $\alpha$ as 0.1 works well in one embodiment.

The originality rank process 240, then exits at step 249.

Figure 11:
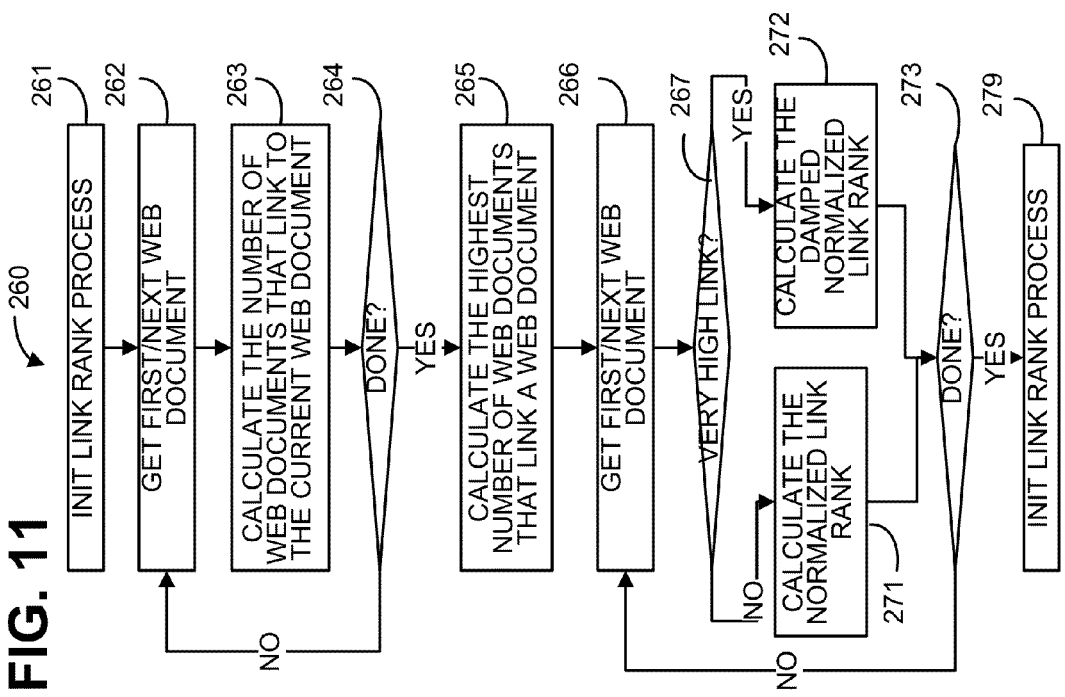
FIG. 11 is a flow chart illustrating an example of the operation of the link rank process utilized in the topic initiator detection system of the present invention, as shown in FIGS. 2-3 and 5.

FIG. 11 is a flow chart illustrating an example of the operation of the link rank process 260 utilized in the topic initiator detection system 100 of the present invention, as shown in FIGS. 2-3 and 5. The link rank process 260 determines the probability of a Web document being the topic initiator by calculating a function based on the link information. The assumption is that, if a document is cited by other documents, then it has a better chance of being the topic initiator.

First, at step 261, the link rank process 260 is initialized. This initialization includes the startup routines and processes embedded in the BIOS of the server 11. The initialization also includes the establishment of data values for particular data structures utilized in the link rank process 260.

At step 262, the link rank process 260 gets the first/next Web document. At step 263, the link rank process 260 calculates the number of Web documents that link to the current Web document. The link information of a Web document is extracted from both the "href" values in the webpage format file and the text content. At step 264, it is determined if there are more Web documents to be processed. If it is determined at step 264 that there are more Web documents to be processed, then the link rank process 260 returns to repeat steps 262-264. However, if it is determined at step 264 that there are no more Web documents to be processed, then the link rank process 260 calculates the highest number of Web documents that link to any one Web document at step 265.

At step 266, the link rank process 260 gets the first/next Web document. At step 267, it is determined if the highest number of Web documents linked to any one Web document is very high. If it is determined at step 267 that the highest number of Web documents that link to any Web document is not very high, then the link rank process 260 calculates the normal link rank at step 271. The probability of a Web document $d_i$ of being the topic initiator is determined by calculating a function based on the link information. The assumption here is that, if a document is cited by other documents, then it has a better chance of being the topic initiator.

An normalized rank method utilized at step 271 is as follows, $$P'_{Link}(d_i) = \frac{InDegree(d_i)}{InDegree_{max}} \qquad (20)$$

where $InDegree_{max}$ is the maximum InDegree for the Web documents.

However, if it is determined at step 267 that a Web document exists that has a very high InDegree (the number of Web documents that link to this one), it will dominate the value and make all other Web documents have similar scores. Therefore, the link rank is calculated and normalized, at step 272 using formula 21. Formula 21 calculates the rank and dampens the normalized link rank by introducing a parameter s, which is similar to the damping factor used in PageRank.

$$P_{Link}(d_i) = (1-s)ExpNormInc(InDegree(d_i)) + s \qquad (21)$$
$$= (1-s)\frac{2}{1+e^{-InDegree(d_i)/\mu}} + 2s - 1$$

The value of $P_{Link}(d_i)$ ranges from 0 to 1, which indicates the probability of the Web document of being the topic initiator. Higher score means higher probability. In one experiment, s is set as 0.95 and $\mu$=2. As shown in ExpNormInc function curves, in this case, a small InDegree is enough to indicate the importance of a Web document, because the topic initiator does not necessarily have to be cited the most. An article from a popular website may get many more citations.

At step 273, it is determined if there are more Web documents to be processed for their link rank. If it is determined at step 273 that there are more Web documents to be processed for their link rank, then the link rank process 260 returns to repeat steps 266-273. However, if it is determined that there are no more Web documents to be processed, the link rank process 260 exits at 279.

Figure 12:
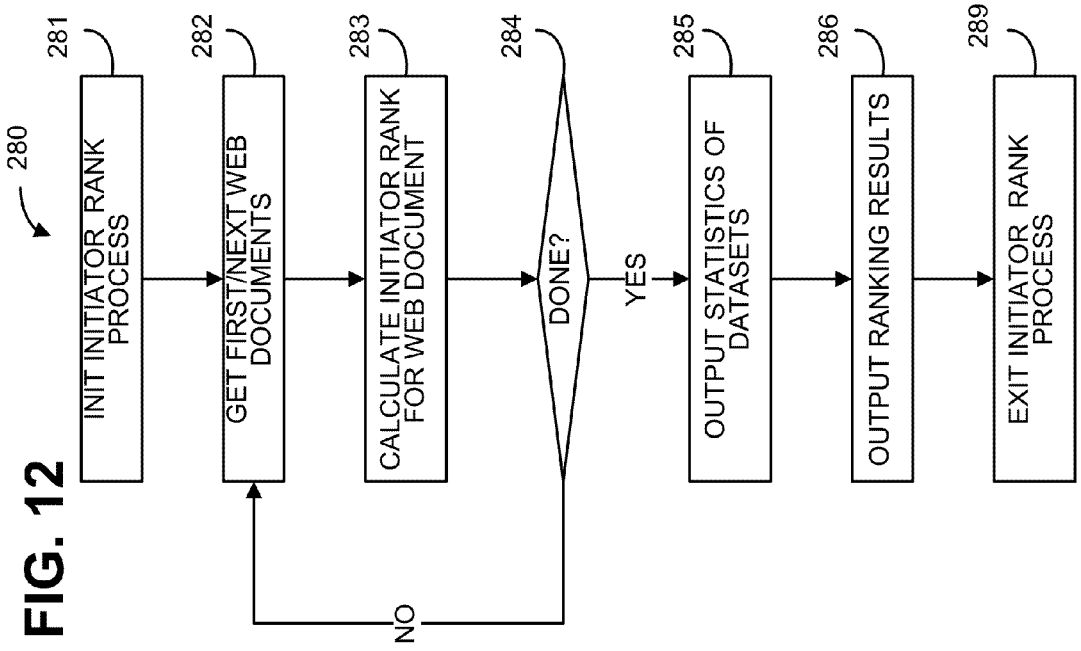
FIG. 12 is a flow chart illustrating an example of the operation of the initiator rank process utilized in the topic initiator detection system of the present invention, as shown in FIGS. 2-3.

FIG. 12 is a flow chart illustrating an example of the operation of the initiator rank process 280 utilized in the topic initiator detection system 100 of the present invention, as shown in FIGS. 2-3. The initiator rank process 280 gives a combined solution and shows good performance in a robust fashion in diverse situations. The initiator rank process 280 is defined as a function. The initiator rank process 280 utilizes the components, such as originality, content similarity, term gap, number of links pointing to a document, and document length factors, independent of each other. The initrank value is calculated as a multiplicative model of the already normalized components.

Using only time, originality, content or link in isolation gives poor performance. If only originality is used, then there will be many original documents. If only time is considered, then there would be many documents ranked high, but which are not really about the query topic. If only content similarity is considered, then the topic initiator is not necessarily the Web document with the highest overall similarity with other documents. This is because it is possible that some later Web documents will contain more information about the topic, and thus have higher overall similarity with other documents.

First at step 281, the initiator rank process 280 is initialized. This initialization includes the startup routines and processes embedded in the BIOS of the server 11. The initialization also includes the establishment of data values for particular data structures utilized in the initiator rank process 280.

At step 282, the initiator rank process 280 gets the first/next Web document to be processed. At step 283, the initiator rank is calculated for the current Web document using formula 22 listed below. The final InitRank, which is short for Initiator Rank, gives a combined solution and shows good performance in a robust fashion in diverse situations. It is defined as a function of several components. It is assumed that the components, such as originality, content similarity, term gap, and document length are factors independent of each other. The InitRank is calculated as a multiplicative model of the already normalized components:

$$InitRank = Orig \cdot DLF \cdot TAC \cdot P_{Time} \cdot P_{Content} \cdot P_{Link} \qquad (22)$$

At step 284, the initiator rank process 280 determines if there are more Web documents to be processed. If it is determined at step 284 that there are more Web documents to be processed, then the initiator rank process 280 returns to repeat steps 282-284. However, if it is determined at step 284 that there are no more Web documents to be processed, then the initiator rank process 280 outputs the statistics of that data set at step 285 and, at step 286, the ranking results are output for each Web document. The initiator rank process 280 then exits at step 289.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may in fact be executed substantially concurrently or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly any "preferred" embodiments, are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for determining a particular document that initiated a topic of interest in a collection of documents, each of the documents having contents and a time it was created, comprising:
    ranking the documents in the collection based on the respective times that the documents were created;
    ranking the documents based on how similar their respective contents are to the topic of interest;
    ranking the documents based on originality of their respective contents;
    ranking the documents based on a type of source each respective document originated from;
    producing a composite ranking of the documents based on the time, the contents, the originality rankings, and the type of source; and
    determining the particular document that initiated the topic of interest from the composite ranking.

2. The method of claim 1, wherein the collection of documents is generated by a query request.

3. The method of claim 2, wherein the contents of the documents are represented by respective titles and respective document texts.

4. The method of claim 2, wherein the contents of the documents are represented by, at least in part,
    (i) respective titles and
    (ii) respective particular sentences, each of the particular sentences containing a query word that is in the query request.

5. The method of claim 2, wherein the contents of the documents are represented by, at least in part,
    (i) respective titles and
    (ii) respective groups of at least 3 sentences, each group including a particular sentence containing a query word that is in the query request.

6. The method of claim 2, wherein the contents ranking comprises calculating how often a term in the query request appears in each one of the documents.

7. The method of claim 6, comprising:
    ranking the documents based on, for each of the documents, how close each of a plurality of terms in the query request appear to each other.

8. The method of claim 1, wherein the originality ranking comprises determining if the documents include a reply indicator.

9. The method of claim 1, further comprising:
    ranking the documents based on a number of hyperlinks in each one of the documents, wherein the composite ranking is also based on the hyperlinks ranking.

10. The method of claim 1, wherein the all the documents in the collection are on the Web.

11. A computer program product for determining a particular document that initiated a topic of interest in a collection of documents, each of the documents having contents and a time it was created, the computer program product comprising:
    a tangible storage medium readable by a computer system and storing instructions for execution by the computer system for performing a method comprising:
    ranking the documents in the collection based on the respective times that the documents were created;
    ranking the documents based on how similar their respective contents are to a topic of interest;
    ranking the documents based on their originality of their respective contents;
    ranking the documents based on an identification of a thread of each of the documents;
    producing a composite ranking of the documents based on the time, the contents, the originality rankings, and the thread; and
    determining the particular document that initiated the topic of interest from the composite ranking.

12. The computer program product of claim 11, wherein the collection of documents is generated by a query request.

13. The computer program product of claim 12, wherein the contents of the documents are represented by respective titles and respective document texts.

14. The computer program product of claim 12, wherein the contents of the documents are represented by, at least in part,
    (i) respective titles and
    (ii) respective particular sentences, each of the particular sentences containing a query word that is in the query request.

15. The computer program product of claim 12, wherein the contents of the documents are represented by, at least in part,
    (i) respective titles and
    (ii) respective groups of at least 3 sentences, each group including a particular sentence containing a query word that is in the query request.

16. The computer program product of claim 12, wherein the originality ranking comprises determining if the documents include a reply indicator.

17. The computer program product of claim 11, wherein the all the documents in the collection are on the Web.

18. The computer program product of claim 11, further comprising:
    ranking the documents based on a number of hyperlinks in each one of the documents, wherein the composite ranking is also based on the hyperlinks ranking.

19. A system for determining a particular document that initiated a topic of interest in a collection of documents, each of the documents having contents and a time it was created, comprising:
    a time ranking module that ranks the documents in the collection based on the respective times that the documents were created;
    a content ranking module that ranks the documents based on how similar their respective contents are to the topic of interest;
    an originality ranking module that ranks the documents based on originality of their respective contents;
    a forum ranking module that ranks the documents based on an identification and name of a forum that each document originated from;
    a composite ranking module that ranks the documents based on the time, the contents, the originality rankings, and the forum; and
    a determination module that determines the particular document that initiated the topic of interest from the composite ranking.

20. The system of claim 19, wherein the collection of documents is generated by a query request.

21. The system of claim 19, further comprising:
    a gap ranking module that ranks the documents based on, for each of the documents, how close each of a plurality of terms in the query request appear to each other.

22. The system of claim 19, wherein the originality ranking module ranks, at least in part, on whether the documents include a reply indicator.

23. The system of claim 19, further comprising:
    a link ranking module that ranks the documents based on the number of hyperlinks in each one of the documents.

24. A method for determining a particular document that initiated a topic of interest in a collection of documents on the web, each of the documents having contents and a time it was created, comprising:

- ranking the documents in the collection based on the respective times that the documents were created;
- ranking the documents based on how similar their respective contents are to the topic of interest;
- ranking the documents based on originality of their respective contents;
- ranking the documents based on a number of hyperlinks in each one of the documents;
- ranking the documents based on a type of bulletin board system (BBS) each document originated from;
- producing a composite ranking of the documents based on the time, the contents, the originality and hyperlink rankings, and the type of BBS; and
- determining the particular document that initiated the topic of interest from the composite ranking.

25. The method of claim 24, further comprising:

ranking the documents based on how close each of a plurality of terms in the query request appear to each other in each of the documents.

* * * * *